United States Patent [19]

Katoh

[11] 4,191,803
[45] Mar. 4, 1980

[54] EXPANDABLE PARTICLES OF A STYRENE POLYMER HAVING SMALL PARTICLE SIZE

[75] Inventor: Tetsuya Katoh, Ichihara, Japan

[73] Assignee: Hitachi Chemical Company, Ltd., Tokyo, Japan

[21] Appl. No.: 961,886

[22] Filed: Nov. 17, 1978

[30] Foreign Application Priority Data

Nov. 17, 1977 [JP] Japan .............................. 52-138094

[51] Int. Cl.$^2$ .............................................. C08J 9/22
[52] U.S. Cl. ................................... 428/407; 521/57; 521/58; 521/84
[58] Field of Search ............... 428/407; 521/57; 54/84

*Primary Examiner*—Morton Foelak
*Attorney, Agent, or Firm*—Frishauf, Holtz, Goodman & Woodward

[57] ABSTRACT

Expandable particles of a styrene polymer containing therein 3 to 8% by weight of a blowing agent and having a particle size of 0.8 to 0.25 mm. in diameter, or their pre-expanded particles, which comprises an ester of sucrose represented by the formula:

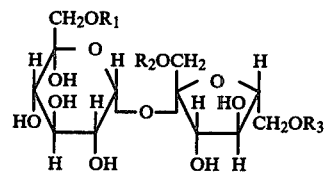

wherein $R_1$, $R_2$ and $R_3$ each represent a hydrogen atom, an alkanoyl group having 6 to 22 carbon atoms or an alkenoyl group having 6 to 22 carbon atoms; and all of $R_1$, $R_2$ and $R_3$ are not hydrogen atoms at the same time, or its derivative, said ester of sucrose or its derivative being coated on the surface of said particles.

4 Claims, No Drawings

EXPANDABLE PARTICLES OF A STYRENE POLYMER HAVING SMALL PARTICLE SIZE

This invention relates to expandable particles of a styrene polymer having small particle size. More particularly, this invention relates to expandable particles of a styrene polymer which show low permeability of water or oil when they are expanded to make polystyrene moldings, e.g., a food vessel such as a cup, a bowl, etc.

It has been known publicly to obtain a food vessel of an expanded polystyrene by expanding expandable polystyrene beads having small particle size which contain, as a blowing agent, an aliphatic hydrocarbon in the form of gas or liquid at room temperature under heating up to a temperature above the softening point of the base resin (a resin belonging to a polystyrene), and further treating the thus expanded particles under heating after charging the same into an incompletely airtight mold. According to general procedures, expanded articles of a styrene polymer are obtained by heating expandable particles of a styrene polymer with steam or hot air to foam or expand the same until the apparent density of the expanded particle becomes a predetermined value (pre-expansion); allowing to stand for a certain period of time (maturing); heating the thus matured particles with steam, after charging the same into a mold having small apertures (final expansion).

The thus obtained food vessel shows different permeabilities of water depending upon the molding conditions etc. General molding processes comprise the following steps of procedure.

(1) Pre-expansion
(2) Charging of the pre-expanded particles
(3) Heating for molding
(4) Cooling A means for reducing the permeability of water in moldings by regulating the conditions of these steps is to conduct the heatings in steps (1) and/or (3) at higher temperature for longer period of time. However, such means is accompanied by the requirement of longer period of time for cooling and thus prolongs the molding cycle of steps (1) to (4), being not a useful method accordingly.

Then, the present invention is a process for reducing the permeability of water without prolonging the molding cycle.

Such extendable particles of a styrene polymer having small particle size as in the present invention is used mainly as material for a food vessel and the moldings thereof is thin, thickness corresponding to 2 to 3 expanded particles. Therefore, the permeability of water (i.e., a leak of water) in the moldings becomes an important problem. In contrast to that, the permeability of water seldom becomes a problem in the case of an article formed with expanded polystyrene particles having larger particle size, which are used for larger moldings such as a fish box etc., wherein the thickness corresponds to 4 to 8 expanded particles.

An object of this invention is to solve the problems as mentioned above.

Namely, the present invention relates to expandable polystyrene particles which are suitable for the use of a food vessel and which are prepared by coating the surface of expandable particles of a styrene polymer having a particle size of 0.8 to 0.25 mm. or their pre-expanded particles with an ester of sucrose or its derivative.

As materials for coating the surface of expandable particles of a styrene polymer having smaller particle size, there have hitherto been used metal salts of higher fatty acids such as calcium stearate, zinc stearate, magnesium stearate, etc., in order to prevent agglomeration of the particles at the time of pre-expansion. Further, there have also been used, as coating materials, commercially available antistatic agents, nonionic surfactants, etc., for the purpose of preventing the generation of static electricity. However, these materials do not show any effect at all on the improvement of the water-permeability in the moldings.

The ester of sucrose used in the present invention is a mono-, di- or tri-ester of sucrose represented by general formula (I):

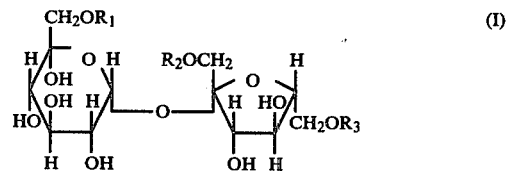

wherein $R_1$, $R_2$ and $R_3$ each represent a hydrogen atom, an alkanoyl group having 6 to 22 carbon atoms or an alkenoyl group having 6 to 22 carbon atoms; and all of $R_1$, $R_2$ and $R_3$ are not hydrogen atoms at the same time or a mixture thereof.

The compound can be obtained by subjecting sucrose to esterification reaction with a higher-fatty acid having 6 to 22 carbon atoms, e.g., stearic acid, palmitic acid, myristic acid, lauric acid, oleic acid, etc. As the derivatives of the ester of sucrose may be mentioned, for example, an ester of sucrose (mono- or di-ester) which was acetylated with acetic acid or its reactive derivative.

While an ester of sucrose shows different properties ranging from hydrophilic to hydrophobic ones depending upon the degree of esterification, it may be selected, as the case may be, depending upon the desired use of the food vessel which is obtained by using the expandable particles of a styrene polymer according to this invention.

The ester of sucrose or its derivative according to this invention may preferably be used in an amount of 0.001 to 0.5% by weight, more preferably 0.01 to 0.10% by weight against the expandable particles of a styrene polymer to be coated therewith. When the ester is used in an amount of below 0.001% by weight, sufficient effect is different to be obtained and when used in an amount of over 0.5% by weight, expandable beads are liable to agglomerate with each other at the time of pre-expansion to cause blocking.

The coating of expandable particles of a styrene polymer with an ester of sucrose or its derivative can be carried out by mixing the both with stirring by using a V-blender, Henschel's mixer or the like.

While the form of the ester of sucrose or its derivative is not limitative, it may preferably be in the form of a finely divided powder, more preferably of a fine powder having a grain size of not more than 0.1 mm., most preferably of not more than 50μ. in order to carry out the coating efficiently. Further, the ester of sucrose or its derivative may be used for the purpose after mixed with a finely divided lubricant and then pulverized. As the finely divided lubricants may be mentioned metal soaps such as zinc stearate, calcium stearate, aluminium stearate and the like, and fatty acid amides such as ethylenebisstearoamide, stearic acid amide and the like.

While the ester or its derivative mentioned above is of a sufficient effect when it is used in single, some additional effects can be obtained when it is used in combination with the finely divided lubricant mentioned above. The finely divided lubricant may preferably be in the form of an extremely fine powder of not more than 300 mesh.

When an ester or its derivative having a melting of not more than around 70° C. among the esters or their derivatives mentioned above is used, the lower layer of the particles which are stored in summer particularly after being packed in bags and piled up, are fused with each other to agglomerate and produce coarse particles, and thus the property at the time of practicing this invention is worsened remarkably and regrinding sometimes is required. Such phenomena may be prevented by mixing preliminarily a finely divided lubricant with the ester. It may be considered that it is because the finely divided lubricant adheres on the surface of the ester powders and protect the same so as to act as a dispersing agent for the ester.

The ratio of the finely divided lubricant to be used against the ester or its derivative may preferably range from 1/10 to 10/1.

The expandable particles according to this invention may comprise, on the surface thereof, an antistatic agent such as glycerol, alcohol, etc.

There is no limitation in particular except that the particle size of the expandable particles of a styrene polymer according to this invention ranges from 0.25 to 0.8 mm., and the expandable particles contain 3 to 8% by weight of a blowing agent. As the case may be, the expandable particles according to this invention may contain a solvent as a plasticizer having affinity to a styrene polymer; or as occasion demands, a foam adjusting agent, a blocking inhibitor and so on.

Pre-expanded particles of a styrene polymer according to this invention may preferably have an apparent specific volume of 8 to 15 cc./g.

The styrene polymer according to this invention includes a polymer of styrene monomer per se and a copolymer of styrene with one or more other monomers such as, for example, methyl acrylate, ethyl acrylate, propyl acrylate, butyl acrylate, methyl methacrylate, hydroxyethyl methacrylate, acrylonitrile, α-methylstyrene, butadiene, divinylbenzene, ethylene glycol dimethacrylate, etc., the amount of which is preferably not less than 50 wt.% of styrene monomer. The styrene polymer of this invention also includes a blended mixture of polystyrene as a main component and other polymers, for example, a blended mixture of polystyrene and polyethylene, a blended mixture of polystyrene and polyphenylene oxide, and so forth.

The above-mentioned blowing agent is an aliphatic hydrocarbon having 3 to 5 carbon atoms or a mixture of the hydrocarbon as a main component and a liquid blowing agent having not less than 6 carbon atoms.

As the above-mentioned blowing agent having 3 to 5 carbon atoms may be mentioned n-butane, isobutane, propane, n-pentane, isopentane, neopentane, methyl chloride, dichlorodifluoromethane and the like. As the liquid blowing agent having not less than 6 carbon atoms may be mentioned n-hexane, n-pentane, n-octane and the isomers thereof, which may preferably be used in an amount of below 50% by weight based on the total amount of blowing agents when the latter is used in combination with the former blowing agent.

The plasticizer mentioned above may or may not be used in the present invention. The kind of the plasticizer and the amount to be used thereof may not be limitative. As the plasticizer may be mentioned an aromatic hydrocarbon such as styrene monomer, ethylbenzene, toluene, etc., a cycloaliphatic hydrocarbon such as cyclohexane, cyclopentane, etc., a chain aliphatic hydrocarbon such as heptane, octane, ect., and so on, which may usually be used in an amount of not more than 3% by weight preferably of not more than 0.5% by weight based on the styrene polymer.

The expandable particles of a styrene polymer according to this invention show their characteristics when used for a vessel, particularly for a food vessel in which is placed Chinese noodles, noodles, instant rice, ice cream, coffee, miso soup, soup, yoghurt, chocolate, potato chips or the like.

The present invention will further be explain in more detail by means of the following Examples.

EXAMPLE 1

With 10 Kg. of expandable particles of a styrene polymer (resin: polystyrene having a molecular weight of around $3 \times 10^5$) having a particle size of 0.6 to 0.4 mm. and containing therein 3.5% by weight of a mixture of propane and butane (weight ratio: propane/butane=6/4) as a blowing agent and 2% by weight of n-hexane as a blowing auxiliary, there were blended with stirring 5 g. of an ester of sucrose (weight ratio: mono-ester/di-and tri-ester=3/7; esterified with stearic acid and palmitic acid; trade name: DK ESTER F-50; manufactured by DAIICHI KOGYO SEIYAKU CO., LTD., Japan) passing through a sieve of 60 mesh, 5 g. of zinc stearate and 25 g. of glycerol. Then the thus treated particles were expanded by heating with hot air to give pre-expanded particles having an apparent specific volume of 10 cc./g. At that time, the pre-expanded particles showed good fluidity and little agglomeration or blocking.

After matured in a metal net for 24 hours, the preexpanded particles were subjected to molding with a molding machine (TW-200 manufactured by TOKO KIKAIKINZOKU CO., LTD., Japan) mounted with a mold for the use of a 500 cc. cup. The cup thus obtained was a fine one and was excellent in the surface smoothness. Water-permeability was tested by placing in the cup 300 g. of a 0.2% aqueous solution of a higher-alcohol containing a trace amount of a pigment, and allowing the cup containing therein the solution to stand for 2 hours. As the result, water did not permeate through the wall of the cup.

EXAMPLES 2 to 4 AND COMPARATIVE EXAMPLES 1 TO 8

Pre-expansion and molding were conducted in the same manner as in Example 1 except that the ester of sucrose shown in Example 1 was replaced with each of the various additives shown in Table 1. The moldings were tested in the same manner as in Example 1. The test results are shown in Table 1.

Table 1

| | Additive | Amount of additive (% by weight based on expandable particles of polystyrene) | Time consumed until permeation of water is observed distinctly |
|---|---|---|---|
| Ex. 1 | Ester of sucrose (mono-ester/di- and tri-esters = 3/7, weight ratio) | 0.05 | not less than 2 hours |
| Ex. 2 | Ester of sucrose 1) (mono-ester/di- and tri-esters = 1/9, weight ratio) | " | not less than 2 hours |
| Ex. 3 | Ester of sucrose 2) (di- and tri-esters) | " | 2 hours |
| Ex. 4 | Acetylated ester of sucrose 3) | " | 2 hours |
| Comparative Ex. 1 | None | — | 20 minutes |
| Comparative Ex. 2 | Stearic acid | 0.05 | not more than 5 minutes |
| Comparative Ex. 3 | Stearyl alcohol | " | not more than 20 minutes |
| Comparative Ex. 4 | Hardened beef tallow | " | not more than 5 minutes |
| Comparative Ex. 5 | Hardened castor oil | " | not more than 5 minutes |
| Comparative Ex. 6 | Carboxymethyl-cellulose | " | 20 minutes |
| Comparative Ex. 7 | Stearic acid amide | " | 20 minutes |
| Comparative Ex. 8 | Methylol amide | " | 10 minutes |

1 DK ESTER F-20 (trade name; esterifying fatty acid: stearic acid and palmitic acid (7:3, weight ratio); manufactured by DAIICHI KOGYO SEIYAKU CO., LTD.)
2 DK ESTER F-10 (trade name; esterifying fatty acid: stearic acid and palmitic acid (7:3, weight ratio); manufactured by DAIICHI KOGYO SEIYAKU CO., LTD.)
3 SUGAR-WAX A10E (trade name; esterifying fatty acid: stearic acid and palmitic acid (7:3, weight ratio); manufactured by DAIICHI KOGYO SEIYAKU CO., LTD.)

EXAMPLES 5 TO 7

Pre-expansion and molding were conducted in the same manner as in Example 1 except that the added amount of the ester of sucrose were replaced with each of those as shown in Table 2. The moldings were tested in the same manner as in Example 1. The test results are shown in Table 2.

Table 2

| | Additive of this invention | Amount of additive (% by weight based on expandable particles of polystyrene) | Time consumed until permeation of water is observed distinctly |
|---|---|---|---|
| Example 5 | Ester of sucrose[4] (di- and tri-esters) | 0.1 | 2 hours |
| Example 6 | Acetylated ester of sucrose[5] | 0.02 | 1 hour |
| Example 7 | Acetylated ester of sucrose[6] | 0.10 | 2 hours |

Note:
[4] The same as in Example 2
[5] and [6] The same as in Example 4

EXAMPLE 8

With 10 Kg. of expandable polystyrene particles having a particle diameter of 0.5 to 0.3 mm. and containing therein 3.0% by weight of butane and 2.0% by weight of n-hexane, there were blended, with stirring in a Henschel's mixer, 10 g. of an ester of sucrose, (weight ratio of mono-ester/di- and tri-esters=7/3; trade name: DK ESTER F-60; manufactured by DAIICHI KOGYO SEIYAKU CO., LTD.), 8 g. of zinc stearate, 5 g. of glycerol and 5 g. of ethyl alcohol. Then, the thus treated expandable particles were expanded by using a hot air in combination with a steam of a pressure of 0.5 Kg./cm$^2$. gauge to give pre-expanded particles having an apparent specific volume of 12 cc./g. At that time, the pre-expanded particles showed good fluidity and little agglomeration or blocking. After matured in a metal net for 24 hours, the pre-expanded particles were subjected to molding by using a molding machine (TW-200, manufactured by TOYO KIKAI-KINZOKU CO., LTD.) mounted with a mold for the use of a 600 cc. bowl. The thus obtained bowl was fine in appearance and its surface was very smooth. Oil-permeability of the bowl was tested by introducing 400 g. of olive oil thereinto and allowing to stand for 24 hours. As the result, the permeation of the olive oil was not observed.

EXAMPLES 9 TO 10 AND COMPARATIVE EXAMPLES 9 TO 10

Pre-expansion and molding were conducted in the same manner as in Example 8 except that the ester of sucrose shown in Example 8 was replaced with each of the additives shown in Table 3. The moldings were tested in the same manner as in Example 8.

The test results are shown in Table 3.

Table 3

| | Additive | Amount of additive (% by weight based on expandable particles of polystyrene) | Time consumed until permeation of olive oil is observed distinctly |
|---|---|---|---|
| Example 8 | Ester of sucrose (mono-ester/di- and tri-esters = 7/3, weight ratio) Ester of sucrose[7] | 0.10 | not less than 24 hours |

Table 3-continued

| | | Test results | |
|---|---|---|---|
| | Additive | Amount of additive (% by weight based on expandable particles of polystyrene) | Time consumed until permeation of olive oil is observed distinctly |
| Example 9 | (mono-ester/di- and tri-esters = 4.5/5.5, weight ratio) | " | 4 hours |
| Example 10 | Ester of sucrose[8] (mono-ester/di- and tri-esters = 3/7, weight ratio) | " | 2 hours |
| Comparative example 9 | None | — | 30 minutes |
| Comparative example 10 | Stearic acid amide | 0.10 | 15 minutes |

Note:
[7]DK ESTER F-90
[8]DK ESTER F-50

As is clear from the above going, permeation of water or oil in the moldings can be prevented by coating the surface of small-sized expandable polystyrene particles with an ester of sucrose or its derivative.

I claim:

1. Expandable particles of a styrene polymer containing therein 3 to 8% by weight of a blowing agent and having a particle size of 0.8 to 0.25 mm., in diameter, or their pre-expanded particles, which comprises an ester of sucrose represented by the formula:

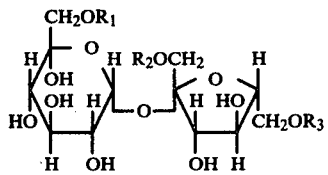

wherein $R_1$, $R_2$ and $R_3$ each represent a hydrogen atom, an alkanoyl group having 6 to 22 carbon atoms or an alkenoyl group having 6 to 22 carbon atoms; and all of $R_1$, $R_2$ and $R_3$ are not hydrogen atoms at the same time, or its derivative, said ester of sucrose or its derivative being coated on the surface of said particles.

2. Expandable particles of a styrene polymer as claimed in claim 1 in which said ester is an ester of stearic acid, palmitic acid, myristic acid, lauric acid, or oleic acid, or the mixture thereof.

3. Expandable particles of a styrene polymer as claimed in claim 1 or 2 in which the amount of said ester of sucrose or its derivative ranges from 0.001 to 0.5% by weight against said styrene polymer.

4. Expandable particles of a styrene polymer as claimed in claim 3 in which the amount of said ester of sucrose or its derivative ranges from 0.01 to 0.10% by weight against said styrene polymer.

* * * * *